United States Patent Office 3,649,673
Patented Mar. 14, 1972

3,649,673
VINYL AND ALLYL CARBAMATES
George A. Burk, Bay City, Mich., assignor to The Dow Chemical Company, Midland, Mich.
No Drawing. Filed June 1, 1970, Ser. No. 42,489
Int. Cl. C07c 125/06
U.S. Cl. 260—482 B    4 Claims

ABSTRACT OF THE DISCLOSURE

Novel compounds of the formula

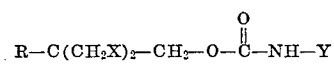

or

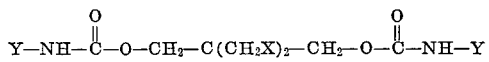

wherein R is hydrogen, lower alkyl, hydroxymethyl or —CH$_2$X; X is chloro or bromo; and Y is vinyl or allyl, are disclosed. They are prepared by reacting vinyl or allyl isocyanate with an alcohol of the formula

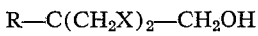

or HOCH$_2$—C(CH$_2$X)$_2$—CH$_2$OH. The compounds are useful as fungicides and herbicides. In example, vinyl isocyanate reacts with 3-chloro-2,2-bis-(chloromethyl)propanol to produce 3-chloro-2,2-bis(chloromethyl)propyl vinylcarbamate.

BACKGROUND OF THE INVENTION

The general reaction of isocyanates with alcohols to produce the corresponding carbamates (urethanes) is a known reaction. The reaction in many instances is conducted in an inert solvent and in the presence of a catalyst, such as dibutyltin diacetate.

SUMMARY OF THE INVENTION

It has now been discovered that novel compounds having the formula

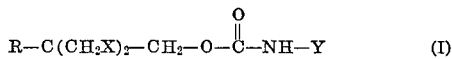    (I)

or

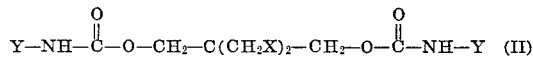    (II)

wherein R is hydrogen, lower alkyl of from 1 to about 4 carbon atoms, hydroxymethyl or —CH$_2$X; X is chloro or bromo; and Y is a vinyl or allyl radical, are perpared by reacting by contacting (a) a compound of the formula Y—NCO (III), with (b) an alcohol of the formula R—C(CH$_2$X)$_2$—CH$_2$OH (IV) or

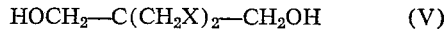    (V)

wherein R, X and Y have the above meaning. The novel compounds are solids or viscous liquids which are useful as fungicides and/or herbicides.

The isocyanate reactants, represented by III, are vinyl isocyanate and allyl isocyanate.

The halogen-bearing alcohol reactants, represented by IV and V, include 3-chloro-2,2-bis(chloromethyl)propanol, 2,2-bis(chloromethyl)-1,3-propanediol, 3-bromo-2,2-bis(bromomethyl)propanol, 2,2-bis(bromomethyl)-1,3-propanediol, 2,2-bis(chloromethyl)butanol, 2,2-bis(bromomethyl)hexanol, and the like and the corresponding alkanols and 1,3-propanediols bearing a mixture of chloromethyl and bromomethyl substituents.

The subject compounds are prepared by reacting by contacting III with IV or V. The process is preferably conducted in an inert solvent and in the presence of a catalyst. A chlorinated or brominated hydrocarbon (e.g., CHCl$_3$, CCl$_4$ and the like) is typically used as a solvent, and substantially any compound known to catalyze the reaction between isocyanates and alcohols may be used. Such compounds form a known class of catalysts and includes organotin compounds, such as dibutyltin diacetate.

Substantially any ratio of reactants is operable but at least one mole of III per hydroxy equivalent in IV or V is preferred, i.e. at least a stoichiometric amount. Typically, an excess of III is preferred to assure complete reaction.

The reaction temperature and pressure are generally not critical so long as the reaction mixture remains substantially liquid. Temperatures of from about 10° C. to about 100° C. are advantageous under atmospheric pressure. Reaction times of from a few minutes to about 48 hours are generally sufficient under such conditions of temperature and pressure for the reaction to poceed to substantial completion.

SPECIFIC EMBODIMENTS

The following examples further describe the novel products and their method of preparation.

EXAMPLE 1

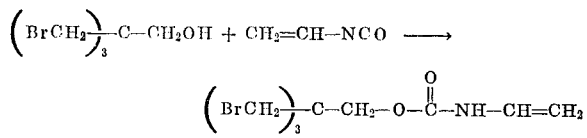

2,2-bis(bromomethyl)-3-bromopropanol (32.5 g., 0.1 mole) in 150 ml. of CHCl$_3$ was charged to a vessel equipped with a stirring means. To this was added sequentially with stirring, vinyl isocyanate (slightly more than 0.1 mole—inhibited with trace amounts of dinitro-o-cresol) and 0.5 ml. of dibutyltin diacetate. The temperature rose from about 25° C. to 65° C. The reaction mixture was then stirred for 24 hours at room temperature. The solvent was removed from the mixture under reduced pressure and 45 g. of a white solid residue was obtained. The crude product was recrystallized in n-hexane and identified by elemental analysis and infrared (IR) spectroscopy. Product yield, ca. 75% of theory. Melting point: 67–68° C.

TABLE I

| Elemental analysis | Theory, percent | Found, percent |
|---|---|---|
| C | 24.3 | 25.0 |
| H | 3.55 | 3.3 |
| Br | 60.8 | 60.4 |
| N | 3.55 | 3.7 |

EXAMPLE 2

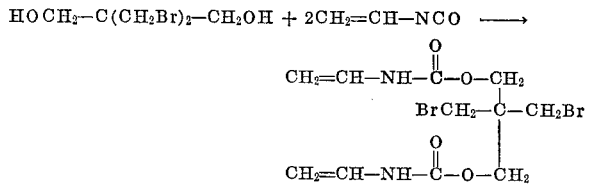

In like manner, 2,2-bis(bromomethyl)-1,3-propane-diol (26.2 g., 0.1 mole) was reacted with vinyl isocyanate (14 g., 0.2 mole) in 200 ml. of CHCl$_3$ and in the presence of 0.5 ml. of dibutyltin diacetate. The mixture was stirred for 30 min. and allowed to stand for 24 hrs. at room temperature. The crude solid product was isolated by filtration and recrystallized in an n-hexane/acetone mixture to give a white crystalline material melting at 148–9° C. in about 90% yield, based on theory. IR and elemental analysis confirmed the structure.

TABLE II

| Elemental analysis | Theory, percent | Found, percent |
| --- | --- | --- |
| C | 33.0 | 32.9 |
| H | 4.0 | 4.0 |
| Br | 40.0 | 39.8 |
| N | 7.0 | 6.9 |

EXAMPLE 3

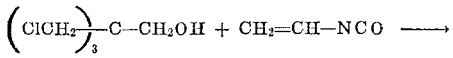

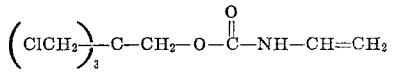

In like manner, 2,2-bis(chloromethyl)-3-chloropropanol (19.1 g., 0.1 mole) was reacted with vinyl isocyanate (7.2 g., ca. 0.1 mole) in 200 ml. CHCl₃ with 0.5 ml. of dibutyltin diacetate catalyst. The product was recovered as a light-yellow liquid boiling at 122–124° C. at 0.5 mm. of Hg.

TABLE III

| Elemental analysis | Theory, percent | Found, percent |
| --- | --- | --- |
| Cl | 40.8 | 39.0 |
| N | 5.38 | 5.0 |

EXAMPLE 4

In like manner, 2,2-bis(chloromethyl)-1,3-propanediol (17.1 g., 0.1 mole) was reacted with vinyl isocyanate (14.2 g., ca. 0.2 mole) in 250 ml. benzene with 1 ml. dibutyltin diacetate. The reactants were mixed and allowed to stand for 16 hours. A cream-colored solid (3.5 g.; M.P. 160–5° C. with decomposition) was separated from the mixture by filtration. The solvent was removed from the filtrate leaving a crystalline residue. Recrystallization of this residue in ethyl ether produced a white solid melting at 101–102° C.; product yield: 67% of theory. The structure of the recrystallized product was identified by IR and elemental analysis.

TABLE IV

| Elemental analysis | Theory, percent | Found, percent |
| --- | --- | --- |
| Cl | 22.4 | 21.8 |
| N | 9.2 | 9.7 |

EXAMPLE 5

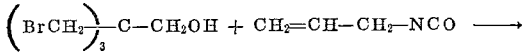

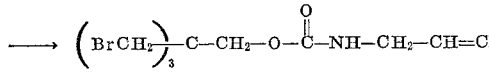

In like manner, 2,2-bis(bromomethyl)-3-bromopropanol (32.5 g., 0.1 mole) was reacted with allyl isocyanate (8.3 g., 0.1 mole) in 200 ml. of CCl₄ with 0.5 ml. of dibutyltin diacetate. The temperature rose from 26° C. to 53° C. within 15 minutes after mixing. The mixture was warmed to 88° C., maintained at that temperature for 10 minutes and cooled to room temperature. The solvent was removed under reduced pressure. The solid residue was purified by recrystallization in n-hexane (M.P. 64–65° C.). Product yield was ca. 100% of theory. The product was identified by IR, Raman spectroscopy and elemental analysis.

TABLE V

| Elemental analysis | Theory, percent | Found, percent |
| --- | --- | --- |
| C | 26.4 | 27.1 |
| H | 3.46 | 3.7 |
| Br | 58.9 | 55.8 |
| N | 3.45 | 3.6 |

EXAMPLE 6

In like manner, 2,2-bis(chloromethyl)butanol-1 (11.8 g., 0.07 mole) was reacted with allyl isocyanate (9.96 g., 0.12 mole) in 10 ml. of CHCl₃ and in the presence of 0.5 ml. of dibutyltin diacetate. The temperature rapidly rose from room temperature to about 83° C., thus expelling most of the CHCHl₃. The impurities were removed from the reaction product by warming the mixture under reduced pressure (93° C. at 1 mm. Hg). The pot residue was a colorless heavy oil which was identified as the product by IR and nuclear magnetic resonance. Product yield was 52% of theory (9.2 g.).

Separate nutrient agar compositions, containing 3-bromo - 2,2 - bis(bromomethyl)propyl vinylcarbamate (from Example 1) as the sole active agent in an antimicrobial concentration of from 100 to 500 parts per million (p.p.m.), were inoculated with viable cell suspensions of the following organisms and incubated under conditions conducive to microbial growth. Complete inhibition and control of Downy mildew (400 p.p.m.), *Staphylococcus aureus* (500 p.p.m.), *Trichophyton mentagrophytes* (100 p.p.m.), *Bacillus subtilis* (100 p.p.m.), *Pullularia pullulans* (500 p.p.m.), *Mycobacterium phlei* (100 p.p.m.), *Rhizopus nigricans* (500 p.p.m.) and substantial inhibition and control (i.e., 50% or more) of *Ceratocystis ips* (100 p.p.m.), *Cephaloascus fragans* (100 p.p.m.) and *Aspergillus terreus* (100 p.p.m) was obtained. As a control, separate nutrient agar compositions (containing no fungicide) were similarly inoculated and incubated. In each instance, vigorous and luxuriant growth of the named organisms was obtained.

3-bromo-2,2-bis(bromomethyl)propyl vinylcarbamate was also effective as a herbicide when applied as a spray of an aqueous solution or oil-in-water or water-in-oil emulsion to prohibit or retard the growth of radishes, beans, yellow foxtail, bean mildew, cotton and sorghum at 0.4 weight percent concentrations and 10 pounds/acre dosage.

In similar testing, the product of Example 2 at a concentration of 500 p.p.m. in water completely controlled *Mycobacterium phlei*, and at 0.4 weight percent concentration substantially prohibited the growth of bean mildew and cotton.

In like manner the product of Example 4 at a concentration of 500 p.p.m. in water was completely effective in prohibiting the growth of *Trichophyton mentagrophytes*, *Bacillus subtilis* and *Mycobacterium phlei* and substantially inhibited tomato late blight, and the product of Example 5 at a concentration of 500 p.p.m. in water completely prohibited the growth of *Mycobacterium phlei* and substantially inhibited downy mildew, tomato late blight, *Trichophyton mentagrophytes*, *Bacillus subtilis*, *Aspergillus terreus*, *Rhizopus nigricans* and when applied as an aqueous solution, water-in-oil or oil-in-water emulsion at a dosage of 10 lbs./acre, it substantially killed or retarded the growth of Barnyard grass and Pig weeds.

The remaining compounds described herein are likewise effective and useful as fungicides and/or herbicides when similarly applied.

In like manner, the following compounds are prepared:

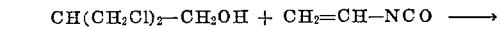
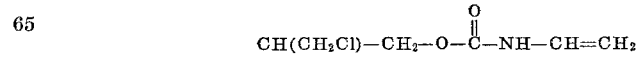
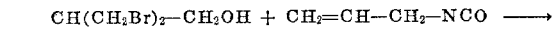
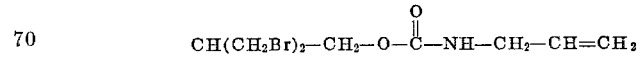
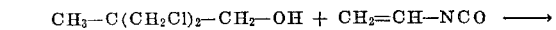
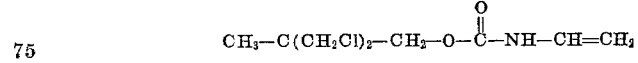

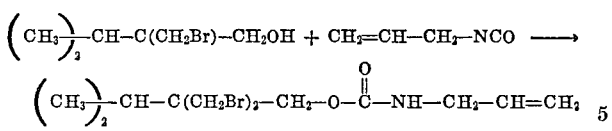

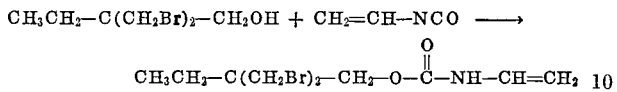

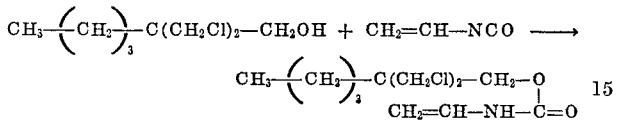

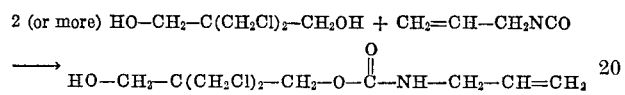

2 (or more) HO—CH₂—C(CH₂Cl)₂—CH₂OH + CH₂=CH—CH₂NCO

⟶ HO—CH₂—C(CH₂Cl)₂—CH₂—O—C(=O)—NH—CH₂—CH=CH₂

Other compounds defined by (I) and (II) may be prepared in like manner.

I claim:
1. A compound of the formula

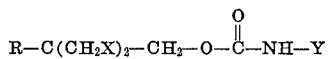

or

wherein R is hydrogen, lower alkyl, hydroxymethyl or —CH₂X; X is chloro or bromo; and Y is a vinyl or allyl radical.

2. The compound defined in claim 1 wherein Y is vinyl.
3. The compound defined in claim 1 wherein Y is allyl.
4. The compound defined in claim 1 wherein R is —CH₂X, X having the aforesaid meaning.

References Cited
UNITED STATES PATENTS 2,647,916  8/1953  Kaiser _____ 260—482
2,697,720  12/1954 Kaiser _____ 260—482

LORRAINE A. WEINBERGER, Primary Examiner

P. KILLOS, Assistant Examiner

U.S. Cl. X.R.

71—76, 106; 260—482 C; 424—300